United States Patent
Matoy et al.

(10) Patent No.: US 9,573,591 B2
(45) Date of Patent: Feb. 21, 2017

(54) SYSTEM AND METHOD UTILIZING DETECTED LOAD FOR VEHICLE HANDLING

(71) Applicant: Continental Automotive Systems, Inc., Auburn Hills, MI (US)

(72) Inventors: Eric A. Matoy, Leonard, MI (US); Richard N. Blust, Grand Blanc, MI (US); Justin A. Ruediger, Orion, MI (US); Chris A. Harrison, Shelby Township, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/661,041

(22) Filed: Mar. 18, 2015

(65) Prior Publication Data
US 2016/0272198 A1 Sep. 22, 2016

(51) Int. Cl.
*B60W 30/045* (2012.01)
*B60W 10/22* (2006.01)
*B60W 10/30* (2006.01)
*B60G 17/016* (2006.01)
(Continued)

(52) U.S. Cl.
CPC ........ *B60W 30/045* (2013.01); *B60G 17/0162* (2013.01); *B60G 17/0195* (2013.01); *B60G 17/08* (2013.01); *B60W 10/22* (2013.01); *B60W 10/30* (2013.01); *B60G 2400/0523* (2013.01); *B60G 2400/104* (2013.01); *B60G 2400/204* (2013.01); *B60G 2400/41* (2013.01); *B60G 2400/52* (2013.01); *B60G 2400/61* (2013.01); *B60G 2400/63* (2013.01); *B60G 2500/10* (2013.01); *B60G 2800/244* (2013.01); *B60G 2800/246* (2013.01); *B60W 2520/00* (2013.01); *B60W 2520/14* (2013.01); *B60W 2530/14* (2013.01); *B60W 2710/22* (2013.01); *B60W 2710/30* (2013.01); *B60W 2900/00* (2013.01)

(58) Field of Classification Search
CPC .... B60W 30/045; B60W 10/22; B60W 10/30; B60W 2520/00; B60W 2520/14; B60W 2530/14; B60W 2710/22; B60W 2710/30; B60W 2900/00; B60G 17/0162
USPC ......................................................... 701/36
See application file for complete search history.

(56) References Cited

U.S. PATENT DOCUMENTS 4,989,148 A 1/1991 Gurke et al.
5,251,136 A 10/1993 Fukuyama et al.
(Continued)

FOREIGN PATENT DOCUMENTS

EP 2631161 A1 8/2013
WO 2010030158 A1 3/2010

OTHER PUBLICATIONS

GB1604338.2 Search and Examination Report dated Sep. 9, 2016.

*Primary Examiner* — Atul Trivedi

(57) ABSTRACT

A method of controlling drivability of a vehicle detects an overall load acting on the vehicle. A mass of the vehicle or an estimate thereof is obtained. A controller determines whether the vehicle is negotiating a curve during a driving situation. If the vehicle is negotiating a curve during the driving situation, the controller determines whether the vehicle has a tendency to oversteer or to understeer. The load acting on the vehicle is dynamically changed or a suspension stiffness of the vehicle is dynamically adjusted to reduce the tendency of the vehicle to oversteer or to understeer.

19 Claims, 3 Drawing Sheets

(51) Int. Cl.
*B60G 17/0195* (2006.01)
*B60G 17/08* (2006.01)

(56) References Cited

U.S. PATENT DOCUMENTS

| | | | | |
|---|---|---|---|---|
| 5,402,342 A * | 3/1995 | Ehret | ............... | B60G 17/0162 180/197 |
| 5,711,024 A * | 1/1998 | Wanke | ............... | B60T 8/1755 180/197 |
| 6,125,319 A * | 9/2000 | Hac | ............... | B60T 8/17636 303/150 |
| 6,456,920 B1 * | 9/2002 | Nishio | ............... | B60T 8/17551 303/140 |
| 8,395,491 B2 | 3/2013 | Kummel et al. | | |
| 8,712,639 B2 * | 4/2014 | Lu | ............... | B60G 17/0195 701/36 |
| 8,718,872 B2 * | 5/2014 | Hirao | ............... | B60G 17/08 701/38 |
| 9,290,165 B2 * | 3/2016 | Messih | ............... | B60G 17/016 |
| 2002/0128760 A1 | 9/2002 | Bodie et al. | | |
| 2003/0156021 A1 * | 8/2003 | Tabata | ............... | B60C 23/0416 340/442 |
| 2004/0024504 A1 * | 2/2004 | Salib | ............... | B60G 17/0162 701/38 |
| 2004/0024505 A1 * | 2/2004 | Salib | ............... | B60G 17/0162 701/38 |
| 2005/0131604 A1 * | 6/2005 | Lu | ............... | B60G 17/0162 701/38 |
| 2005/0149240 A1 * | 7/2005 | Tseng | ............... | B60G 17/016 701/38 |
| 2005/0206231 A1 * | 9/2005 | Lu | ............... | B60G 17/0162 303/146 |
| 2005/0217921 A1 * | 10/2005 | Mori | ............... | B60K 17/35 180/433 |
| 2005/0236782 A1 * | 10/2005 | Kobayashi | ......... | B60G 17/0152 280/6.159 |
| 2006/0074530 A1 * | 4/2006 | Meyers | ............... | B60G 17/016 701/1 |
| 2006/0190150 A1 * | 8/2006 | Milot | ............... | B60C 23/04 701/38 |
| 2006/0253240 A1 * | 11/2006 | Rao | ............... | B60W 50/035 701/48 |
| 2006/0276944 A1 * | 12/2006 | Yasui | ............... | B60T 8/172 701/37 |
| 2007/0017727 A1 * | 1/2007 | Messih | ............... | B60G 17/016 180/282 |
| 2007/0021875 A1 * | 1/2007 | Naik | ............... | B60K 17/356 701/1 |
| 2007/0185638 A1 * | 8/2007 | Odenthal | ............ | B60T 8/17555 701/70 |
| 2007/0260383 A1 * | 11/2007 | Sundaram | ........ | B60W 50/0205 701/70 |
| 2008/0059021 A1 * | 3/2008 | Lu | ............... | B60G 17/0195 701/36 |
| 2008/0059034 A1 * | 3/2008 | Lu | ............... | B60T 8/17552 701/71 |
| 2008/0082246 A1 * | 4/2008 | Brown | ............... | B60T 8/17552 701/91 |
| 2008/0086248 A1 * | 4/2008 | Lu | ............... | G05D 1/0891 701/41 |
| 2008/0086251 A1 * | 4/2008 | Lu | ............... | B60T 8/1755 701/70 |
| 2008/0091317 A1 * | 4/2008 | Green | ............... | B60G 17/0162 701/38 |
| 2008/0183353 A1 * | 7/2008 | Post | ............... | B60G 17/0165 701/42 |
| 2008/0281482 A1 * | 11/2008 | Huang | ............... | B60W 40/11 701/37 |
| 2009/0187324 A1 * | 7/2009 | Lu | ............... | B60K 31/00 701/94 |
| 2010/0191423 A1 * | 7/2010 | Koyama | ............... | B60W 30/09 701/42 |
| 2011/0015844 A1 * | 1/2011 | Perkins | ............... | B60T 8/17554 701/69 |
| 2012/0018962 A1 * | 1/2012 | Ac | ............... | B60G 17/021 280/5.5 |
| 2012/0109458 A1 * | 5/2012 | Sidlosky | ............... | B60G 17/02 701/41 |
| 2013/0060414 A1 * | 3/2013 | Lee | ............... | B62D 1/286 701/23 |
| 2013/0151074 A1 * | 6/2013 | Takeuchi | ............... | B60W 10/06 701/37 |
| 2014/0195116 A1 * | 7/2014 | Hrovat | ............... | B60W 10/06 701/38 |
| 2015/0032332 A1 * | 1/2015 | Kikuchi | ............... | B60W 10/22 701/37 |
| 2015/0291210 A1 * | 10/2015 | Kageyama | ............ | B60T 8/1755 701/41 |

* cited by examiner

SYSTEM AND METHOD UTILIZING DETECTED LOAD FOR VEHICLE HANDLING

FIELD

The invention relates to passenger vehicle handling and, more particularly, to a system and method that dynamically changes the load on the vehicle or the vehicle suspension to reduce oversteer or understeer tendencies.

BACKGROUND

Modern motor vehicles are often equipped with a vehicle dynamics control system, such as the known ESC (Electronic Stability Control) system that stabilizes the vehicle in critical driving situations. For this purpose, the braking force is usually increased in a targeted manner at individual wheels of the vehicle in order to generate a yaw moment which stabilizes the vehicle. However, the brake intervention, which is carried out particularly by the ESC system, can be sensed clearly by the driver as a vehicle deceleration, and therefore, can be unexpected and uncomfortable. The ESC system also typically reacts after the instability has occurred.

Thus, there is a need to provide a system and method that dynamically changes the load on the vehicle or suspension stiffness to reduce oversteer or understeer tendencies based on vehicle load information along with other vehicle information prior to the instability.

SUMMARY

An objective of the invention is to fulfill the need referred to above. In accordance with the principles of an embodiment, this objective is obtained by providing a method of controlling drivability of a vehicle. The method detects an overall load acting on the vehicle. A mass of the vehicle or an estimate thereof is obtained. A controller determines whether the vehicle is negotiating a curve during a driving situation. If the vehicle is negotiating a curve during the driving situation, the controller determines whether the vehicle has a tendency to oversteer or to understeer. The load acting on the vehicle is dynamically changed or a suspension stiffness of the vehicle is dynamically adjusted to reduce the tendency of the vehicle to oversteer or to understeer.

In accordance with another aspect of an embodiment, a driving stability control system for a vehicle includes vehicle load sensor structure constructed and arranged to obtain an overall load acting on a vehicle. Vehicle information sensor structure is constructed and arranged to obtain vehicle information including at least yaw and steering information of the vehicle. First actuators are constructed and arranged to control aerodynamic components of the vehicle. Second actuators are constructed and arranged to control a suspension of the vehicle. A vehicle behavior controller is constructed and arranged to receive the vehicle information and the overall load acting on the vehicle and based thereon, to send a signal to the first actuators to dynamically adjust the aerodynamic components to change a load on the vehicle, or to send a signal to the second actuators to dynamically adjust the suspension of vehicle, to reduce a tendency of the vehicle to oversteer or understeer.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

Figure 1:
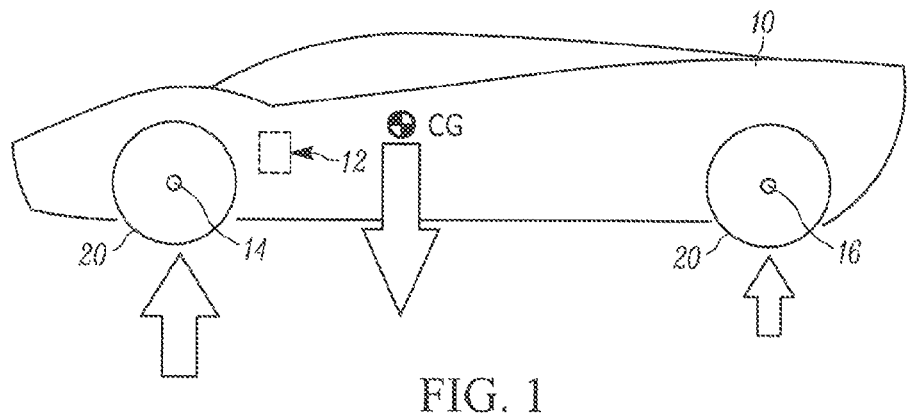
FIG. 1 is schematic view of a vehicle having a driving stability control system in accordance with an embodiment.

With reference to FIG. 1, a motor vehicle 10 includes a driving stability control system, generally indicated at 12, in accordance with and embodiment. The vehicle 10 is preferably a two-axle, four-wheel motor vehicle having steerable wheels on at least one front axle 14 and, if appropriate, also on a rear axle 16. FIG. 1 shows the center of gravity CG and the forces acting on the vehicle.

Figure 2:
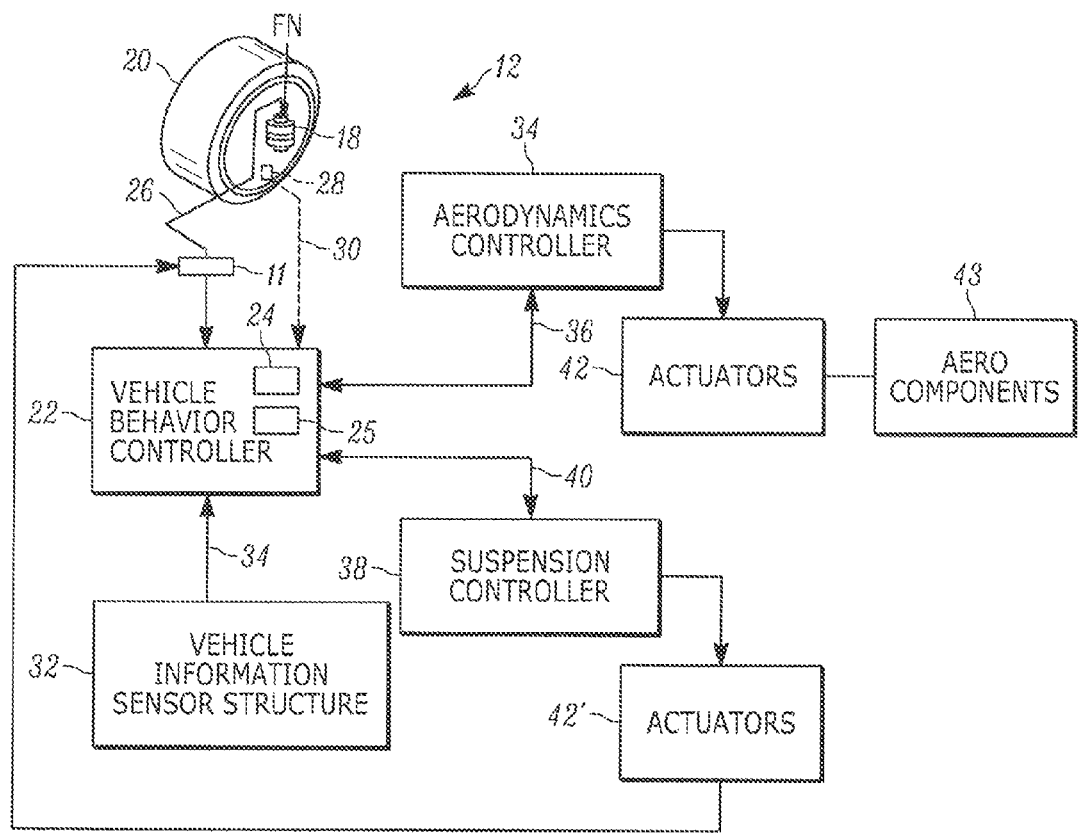
FIG. 2 is a detailed schematic illustration of the driving stability control system of FIG. 1.

FIG. 2 is a detailed schematic illustration of the driving stability control system 12. The system 12 includes a vehicle load sensor structure that can include or use the air suspension system 11 for a vehicle 10. A conventional suspension such as an air bellows 18 is associated with a respective wheel 20. Only one of the four wheels 20 of the vehicle 10 is shown in FIG. 2. An air tank and pump (not shown) of the suspension system 11 provide a source of air to the bellows 18. A vehicle behavior controller 22, including a processor circuit 24 and memory circuit 25, controls a solenoid valve 42' associated with the suspension system 11. The solenoid valves are associated with the pump to control the bellows 18 and thus the suspension of the vehicle 10. The controller 22 can be an ESC controller.

The controller 22 can obtain, via signal lines 26, real time load information on all four wheels 20, which represents the normal force FN applied to each wheel. The total normal force FN_total or vehicle load (overall load acting on vehicle) can be calculated by summing the individual forces together.

Alternatively, the vehicle load can be obtained by Continental's electronic Tire Information System (eTIS) that utilizes a sensor 28 integrated directly into the inner liner of the tire of each wheel 20. The sensor 28 sends, via signal lines 30, the vehicle load information at each wheel based on pressure and area to the controller 22.

With reference to FIG. 2, the system 12 also includes vehicle information sensor structure 32 electrically connected with the controller 22 via signal line 34. The vehicle information sensor structure 32 preferably includes the conventional vehicle speed sensor(s), yaw rate sensor, lateral acceleration sensors and steering angle sensor, for example, as disclosed in U.S. Pat. No. 8,395,491 B2, the contents of which is hereby incorporated by reference into this specification.

Returning to FIG. 1, if the loading of the vehicle 10 is such that the center of gravity CG shifts to the front of the vehicle, such as from the passenger and cargo loading, the result will be a vehicle that has an understeering tendency. The system 12 is configured to combine the vehicle load information (regardless of how it is obtained) with information derived from the sensor structure 32 to predict the behavior of the vehicle (oversteer and understeer tendency). This predicted behavior can then be combined with other systems such as active aerodynamics or active suspension systems to counteract the unwanted vehicle behavior.

Thus, with reference to FIG. 2, the system 12 includes an aerodynamics controller 34 electrically coupled with the controller 22 via signal line 36. The system 12 further includes a suspension controller 38 electrically coupled to the controller 22 via signal line 40. Both of the aerodynamics controller 34 and the suspension controller 38 are electrically coupled to actuators 42, the function of which will be explained below. It can be appreciated that if desired the controllers 34 and 38 can be integrated into or be part of the vehicle behavior controller 22.

Figure 3:
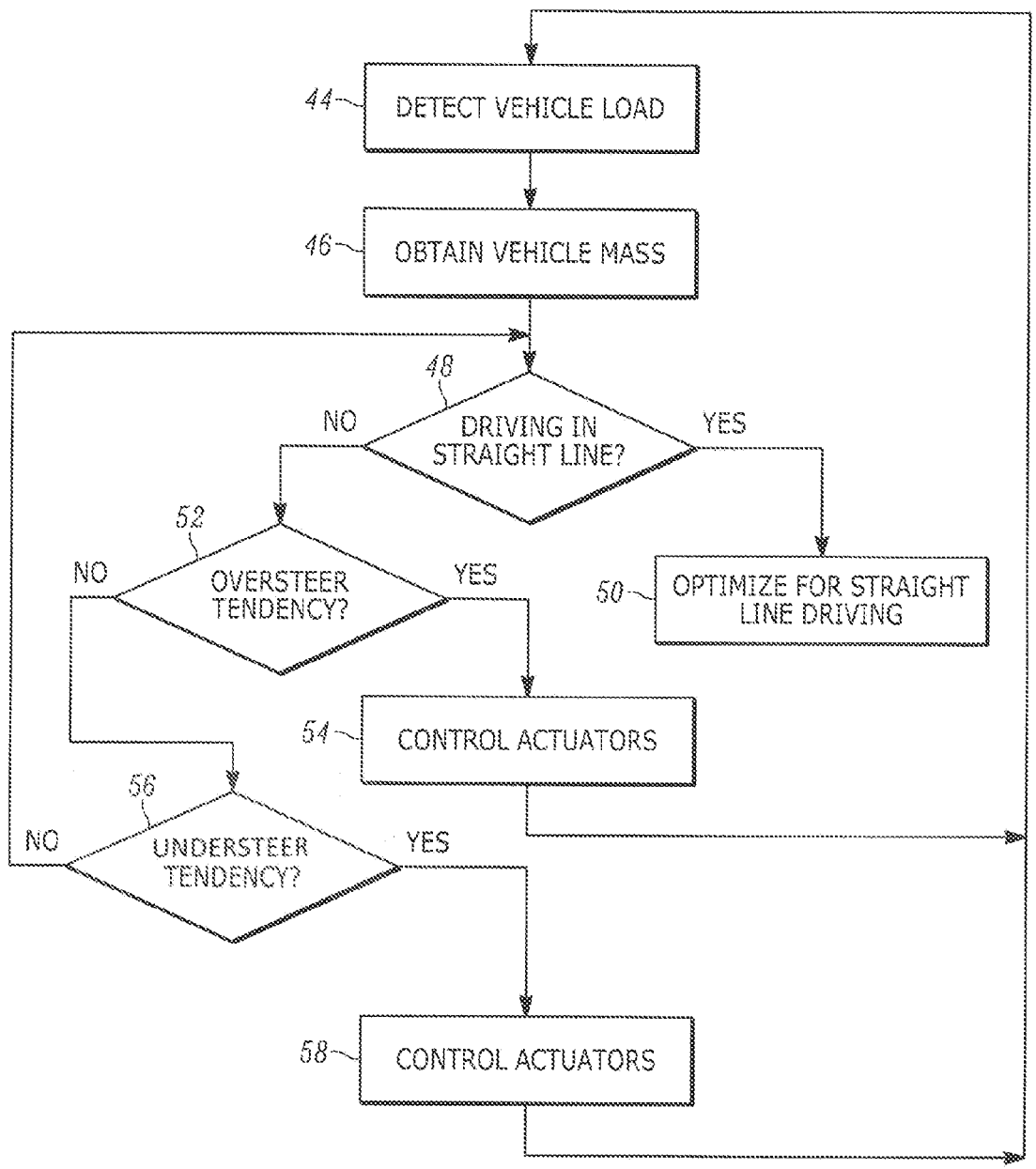
FIG. 3 is a flow chart of a method of an embodiment.

With reference to FIG. 3, the steps or algorithm for controlling driving stability for a vehicle are shown in accordance with an embodiment. In step 44, the vehicle load is detected by the via the suspension system or from the eTIS system as noted above, or in any other manner, and the data is stored in memory 25. The vehicle mass is obtained in step 46. The vehicle mass can be a constant value, a CAN message or can be estimated. Next, in step 48, the driving situation is determined. In particular, based on information (e.g., yaw rate, steering information and speed) from the information sensor structure 32 and from the vehicle load and mass, the controller 22 determines if the vehicle is driving in a straight line in step 48. If the vehicle is operating in a straight line driving situation, in step 50, the controller 22 optimizes the drivability for straight line driving by dynamically controlling the aerodynamics of the vehicle 10 for acceleration, deceleration and drag/efficiency. Also, the aerodynamic force on the vehicle can be dynamically controlled during braking. With reference to FIG. 2, control of the aerodynamics can be performed by the controller 22 instructing the aerodynamics controller 34 to control actuators 42 to adjust the aerodynamic components 43.

If the vehicle is negotiating a curve during a driving situation, in step 52, the processor circuit 24 determines if there is a tendency to oversteer based on the loading of the vehicle. If so, in step 54, the controller 22 instructs the aerodynamics controller 34 to control actuators 42 to adjust the aerodynamic components 43 of the vehicle to increase the aerodynamic load on the rear of the vehicle or decrease the aerodynamic load on the front of the vehicle. Alternatively, or in conjunction with the above step to reduce oversteer, the controller 22 can instruct the suspension controller 34 to control actuators 42' (e.g., the solenoids associated with the suspension system 11) to increase the front roll stiffness or decrease the rear roll stiffness. The controller 22 can also activate the ESC system or change the drive torque distribution to reduce the tendency to oversteer. After changing the load to reduce the oversteer tendency, the process returns to step 44 where the vehicle load is detected again for any further adjustments.

Figure 4:
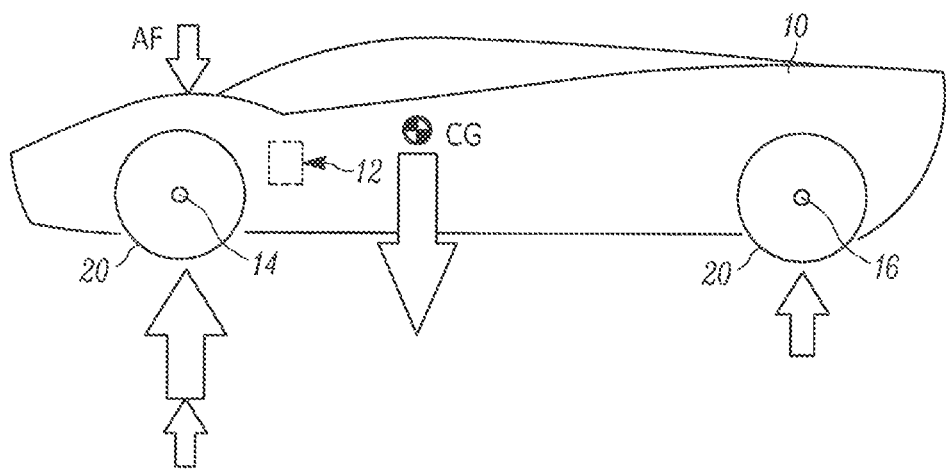
FIG. 4 is a schematic view of the vehicle of FIG. 1 show with the aerodynamic downforce increased by the driving stability control system only on the front axle.

While the vehicle is negotiating a curve during the driving situation and if there is no tendency to oversteer, in step 56, the processor circuit 24 determines if there is a tendency to understeer based on the loading of the vehicle. If so, in step 56, the controller 22 instructs the aerodynamics controller 34 to control actuators 42 to adjust the aerodynamic components 43 of the vehicle to increase the aerodynamic load on the front of the vehicle or decrease the aerodynamic load on the rear of the vehicle. FIG. 4 shows the vehicle 10 with the increased aerodynamic downforce AF only on the front axle 14 that results in a more neutral behaving vehicle before dynamic driving is encountered. Alternatively, or in conjunction with the above step to reduce understeer, the controller 22 can instruct the suspension controller 34 to control actuators 42 (e.g., the solenoids 42' associated with the suspension system 11) to increase the rear roll stiffness or decrease the front roll stiffness. The controller 22 can also activate the ESC system or change the drive torque distribution to reduce the tendency to understeer. After changing the load to reduce the understeer tendency, the process returns to step 44 where the vehicle load is detected again for any further adjustments.

All of the adjustments to reduce the understeer or oversteer tendency happen dynamically in real time with the goal of increasing the cornering capabilities of the vehicle 10. This could also mean increasing the aerodynamic load while cornering and decreasing it while driving straight to reduce drag. Further, the information can be used to calculate a new understeer coefficient that could be used to adjust the bike model to prevent false or sensitive activations. If desired, the severity of yaw control could be increased in critical situations as well as active roll mitigation.

The operations and algorithms described herein can be implemented as executable code within the controller 22 processor circuit 24 as described, or stored on a standalone computer or machine readable non-transitory tangible storage medium that are completed based on execution of the code by a processor circuit implemented using one or more integrated circuits. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 25) causes the integrated circuit(s) implementing the processor circuit 24 to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 25 can be implemented, for example, using a non-volatile memory such as a programmable read only memory (PROM) or an EPROM, and/or a volatile memory such as a DRAM, etc.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of controlling drivability of a vehicle comprising the steps of:
   detecting an overall load acting on the vehicle,
   obtaining a mass of the vehicle or an estimate thereof,
   determining, in a controller, whether the vehicle is negotiating a curve during a driving situation,
   if the vehicle is negotiating a curve during the driving situation, determining, in the controller, whether the vehicle has a tendency to oversteer or to understeer, and
   dynamically changing, independent of vehicle drive torque and braking, the aerodynamic load acting on the vehicle by controlling aerodynamic components of the vehicle or dynamically adjusting, independent of the vehicle drive torque, a suspension stiffness of the vehicle to reduce the tendency of the vehicle to oversteer or to understeer.

2. The method of claim 1, wherein the step of detecting the overall load includes using a suspension system of the vehicle.

3. The method of claim 1, wherein the step of detecting the overall load includes using a sensor embedded in each tire of the vehicle.

4. The method of claim 1, wherein if the vehicle is determined to have a tendency to oversteer, the step of dynamically changing the aerodynamic load includes adjusting the aerodynamic components of the vehicle to increase an aerodynamic load on a rear of the vehicle or to decrease the aerodynamic load on a front of the vehicle.

5. The method of claim 4, wherein the step of adjusting aerodynamic components controls actuators associated with the aerodynamic components.

6. The method of claim 1, wherein if the vehicle is determined to have a tendency to oversteer, the step of dynamically adjusting a suspension stiffness of the vehicle includes increasing roll stiffness at a front of the vehicle or decreasing the roll stiffness at a rear of the vehicle.

7. The method of claim 1, wherein if the vehicle is determined to have a tendency to understeer, the step of dynamically changing the aerodynamic load includes adjusting the aerodynamic components of the vehicle to increase an aerodynamic load on a front of the vehicle or to decrease the aerodynamic load on a rear of the vehicle.

8. The method of claim 7, wherein the step of adjusting aerodynamic components includes controlling actuators associated with the aerodynamic components.

9. The method of claim 1, wherein if the vehicle is determined to have a tendency to understeer, the step of dynamically adjusting a suspension stiffness of the vehicle includes increasing roll stiffness at a rear of the vehicle or decreasing the roll stiffness at a front of the vehicle.

10. The method of claim 1, wherein the determining step includes using yaw, steering and speed information of the vehicle.

11. The method of claim 1, wherein if the vehicle is determined to not be negotiating a curve but is instead in a straight line driving situation, the method further comprising:
   dynamically controlling the aerodynamic components of the vehicle for efficiency or drag.

12. The method of claim 1, further comprising:
   dynamically adjusting the aerodynamic components of the vehicle during braking of the vehicle to increase the aerodynamic load on the vehicle.

13. A driving stability control system for a vehicle comprising:
   vehicle load sensor structure constructed and arranged to obtain an overall load acting on a vehicle,
   vehicle information sensor structure constructed and arranged to obtain vehicle information including at least yaw, steering and speed information of the vehicle,
   first actuators constructed and arranged to control aerodynamic components of the vehicle,
   second actuators constructed and arranged to control a suspension of the vehicle, and
   a vehicle behavior controller constructed and arranged to receive the vehicle information and the overall load acting on the vehicle and based thereon, to send a signal to the first actuators to dynamically adjust, independent of vehicle drive torque and braking, the aerodynamic components to change an aerodynamic load on the vehicle, or to send a signal to the second actuators to dynamically adjust, independent of the vehicle drive torque, the suspension of vehicle, to reduce a tendency of the vehicle to oversteer or understeer.

14. The system of claim 13, wherein the vehicle load sensor structure is constructed and arranged to utilize components of a suspension system of the vehicle.

15. The system of claim 13, wherein the vehicle load sensor structure comprises a sensor embedded in each tire of the vehicle.

16. The system of claim 13, wherein if the vehicle behavior controller determines that the vehicle has a tendency to oversteer, the first actuators are constructed and arranged to adjust the aerodynamic components to increase an aerodynamic load on a rear of the vehicle or to decrease the aerodynamic load on a front of the vehicle.

17. The system of claim 13, wherein if the vehicle behavior controller determines that the vehicle has a tendency to oversteer, the second actuators are constructed and arranged to increase roll stiffness at a front of the vehicle or decrease the roll stiffness at a rear of the vehicle.

18. The system of claim 13, wherein if the vehicle behavior controller determines that the vehicle has a tendency to understeer, the first actuators are constructed and arranged to adjust the aerodynamic components to increase an aerodynamic load on a front of the vehicle or to decrease the aerodynamic load on a rear of the vehicle.

19. The system of claim 13, wherein if the vehicle behavior controller determines that the vehicle has a tendency to understeer, the second actuators are constructed and arranged to increase roll stiffness at a rear of the vehicle or decrease the roll stiffness at a front of the vehicle.

* * * * *